US00RE43287E

(19) United States
(12) Reissued Patent
Hall et al.

(10) Patent Number: US RE43,287 E
(45) Date of Reissued Patent: Apr. 3, 2012

(54) MULTI-CHIP FACET CUTTING SAW BLADE AND RELATED METHOD

(75) Inventors: Kenneth Hall, East Longmeadow, MA (US); Dayananda Sukadhare, Bayside, NY (US)

(73) Assignee: Irwin Industrial Tool Company, Huntersville, NC (US)

(21) Appl. No.: 13/016,674

(22) Filed: Jan. 28, 2011

Related U.S. Patent Documents

Reissue of:
(64) Patent No.: 7,131,365
Issued: Nov. 7, 2006
Appl. No.: 10/873,519
Filed: Jun. 21, 2004

U.S. Applications:
(62) Division of application No. 12/266,466, filed on Nov. 6, 2008, now abandoned.

(60) Provisional application No. 60/503,338, filed on Sep. 16, 2003.

(51) Int. Cl.
*B27B 33/02* (2006.01)

(52) U.S. Cl. ..... 83/846; 83/848; 83/851; 83/855

(58) Field of Classification Search ..... 83/846–855, 83/661
See application file for complete search history.

(56) References Cited

U.S. PATENT DOCUMENTS 4,011,783 A * 3/1977 Mobley ..... 83/846
4,108,649 A * 8/1978 Moskowitz ..... 419/16
4,423,653 A * 1/1984 Howard ..... 83/820
4,784,033 A * 11/1988 Hayden et al. ..... 83/661
4,827,822 A * 5/1989 Yoshida et al. ..... 83/835
5,425,296 A * 6/1995 Kullmann et al. ..... 83/846
5,477,763 A * 12/1995 Kullman ..... 83/846
5,832,803 A * 11/1998 Hayden, Sr. ..... 83/661
5,882,778 A * 3/1999 Sugizaki et al. ..... 428/216
6,003,422 A * 12/1999 Holston ..... 83/661
6,158,324 A * 12/2000 Kullmann et al. ..... 83/848
6,167,792 B1 * 1/2001 Korb et al. ..... 83/835
6,276,248 B1 * 8/2001 Cranna ..... 83/848
6,276,249 B1 * 8/2001 Handschuh et al. ..... 83/851

(Continued)

OTHER PUBLICATIONS

International Searching Authority, International Search Report for Int'l App. No. PCT/US04/19888, mailed Apr. 6, 2005.*

(Continued)

*Primary Examiner* — Stephen Choi
(74) *Attorney, Agent, or Firm* — McCarter & English, LLP

(57) ABSTRACT

A metal cutting band saw blade has a plurality of cutting teeth defining a cutting direction, and a repeating tooth pattern of between 3 and 7 teeth. Each tooth defines a laterally-extending upper surface having a width and a height with respect to the back edge of the blade, and side surfaces extending laterally and downwardly on opposite sides of the upper surface relative to each other at acute angles relative to the upper surface. The teeth located rearwardly of the first tooth with respect to the cutting direction of the saw blade define progressively lower heights and progressively smaller acute angles of the side surfaces, and the widths of the upper surfaces of these teeth are greater than the width of the upper surface of the respective first tooth.

21 Claims, 5 Drawing Sheets

U.S. PATENT DOCUMENTS

| | | | | |
|---|---|---|---|---|
| 6,443,674 | B1 * | 9/2002 | Jaconi | 408/1 R |
| 6,520,722 | B2 * | 2/2003 | Hopper et al. | 407/42 |
| 2002/0071949 | A1 * | 6/2002 | Liu et al. | 428/325 |
| 2002/0160235 | A1 * | 10/2002 | Caminiti | 428/698 |
| 2002/0166606 | A1 * | 11/2002 | Caminiti | 148/212 |
| 2003/0061920 | A1 * | 4/2003 | Thompson | 83/13 |
| 2003/0096142 | A1 * | 5/2003 | Whiteis | 428/698 |
| 2003/0121391 | A1 * | 7/2003 | Knebel | 83/847 |
| 2004/0121159 | A1 * | 6/2004 | Cloud et al. | 428/421 |

OTHER PUBLICATIONS nternational Searching Authority, Written Opinion of International Searching Authority for Int'l App. No. PCT/US04/19888, mailed Apr. 6, 2005.*

International Bureau, International Preliminary Report on Patentability for Int'l App. No. PCT/US04/19888, mailed Mar. 16, 2006.*

International Search Report for PCT/US04/19888 dated Apr. 6, 2005.

Written Opinion for PCT/US04/19888 dated Apr. 6, 2005.

* cited by examiner

| Tooth | CROSS-HATCHING (AREAS 24,26,28) | MATERIAL REMOVAL CROSS-SECTIONAL AREAS (inches$^2$) |
|---|---|---|
| Tooth #12 | | $4.5 \times 10^{-5}$ in$^2$ |
| Tooth #14 | | $4.6 \times 10^{-5}$ in$^2$ |
| Tooth #16 | | $5.8 \times 10^{-5}$ in$^2$ |

MULTI-CHIP FACET CUTTING SAW BLADE AND RELATED METHOD

Matter enclosed in heavy brackets [ ] appears in the original patent but forms no part of this reissue specification; matter printed in italics indicates the additions made by reissue.

CROSS-REFERENCE TO RELATED APPLICATION

[This application] *More than one reissue application has been filed for the reissue of U.S. Pat. No. 7,131,365. The reissue applications are the present reissue application, and application Ser. No. 12/266,466. The present reissue application is a divisional reissue application of reissue application Ser. No. 12/266,466, filed Nov. 6, 2008, now abandoned, which is a reissue of U.S. Pat. No. 7,131,365, which* claims priority to U.S. Provisional Application No. 60/503,338 filed on Sep. 16, 2003, titled "Multi-Chip Facet Cutting Saw Blade and Related Method", [and is] *all of which are* hereby expressly incorporated by reference as part of the present disclosure.

FIELD OF THE INVENTION

The present invention relates to saw blades, and more particularly, to saw blades, such as band saw blades, that include repeating patterns of cutting teeth having cutting surfaces formed by flat upper surfaces and side surfaces oriented at oblique angles relative to a central plane of the blade and/or of a respective tooth.

BACKGROUND INFORMATION

U.S. Pat. No. 5,477,763 to Kullman shows a band saw blade having a plurality of unset teeth provided in recurring cycles, wherein each recurring cycle includes first and second groups of teeth, with the teeth of the second group being interspersed among the teeth of the first group. The teeth in the first group progressively decrease in height and increase in width from tooth to tooth. The teeth in the second group, on the other hand, are identical to each other, and the width of each tooth in the second group is greater than the width of any tooth of the first group. U.S. Pat. No. 6,276,249 to Handschuh et al. shows a band saw blade having a plurality of unset teeth provided in recurring cycles, wherein the teeth increase in height from tooth to tooth while simultaneously decreasing in width.

One of the drawbacks associated with these and like prior art band saw blades is that the cutting surfaces are defined by the relatively wide flat upper surfaces of the teeth. As a result, the blades may tend to wander laterally during cutting, particularly when cutting relatively large diameter workpieces, such as steel bars greater than about 15 or 20 inches in diameter or width. Thus, the blades may provide a crooked cut, or otherwise may not provide as straight a cut, or consistently as straight a cut, as otherwise desired. Another drawback associated with these and like prior art band saw blades is that the wider or outer teeth tend to take a greater cutting load than the inner or more narrow teeth. In addition, at higher feed rates, the wider or outer teeth tend to take progressively greater cutting loads. As a result, the tooth loading can be relatively unbalanced, which, in turn, can lead to premature failure, or shorter wear life than otherwise desired.

Aluminum titanium nitride (AlTiN) coatings are not believed to have been applied to band saw blades. AlTiN coatings are typically applied by physical vapor deposition to, for example, an underlying steel surface or substrate. If applied to a cutting tool, these coatings require the tool to be run at relatively high speeds and temperatures to achieve desired performance. In addition, these coatings require at break-in that the tool be run dry (i.e., without any lubricant) at relatively high speeds and temperatures in order to oxidize the coating and otherwise obtain the performance advantages thereof. Band saw blades, on the other hand, conventionally have been run at much slower speeds and feed rates than those required for AlTiN coatings. Moreover, conventional wisdom has tended to dictate running band saw blades at relatively slow band speeds and/or feed rates in order to improve wear and/or blade life. As a result, conventional band saw blades typically require a trade off between higher production rates (e.g., faster band speeds and/or feed rates) and wear or blade life. Thus, the longer the wear or blade life, the lower the production rates, and vice versa.

Accordingly, it is an object of the present invention to overcome one or more of the above-described drawbacks and/or disadvantages of the prior art.

SUMMARY OF THE INVENTION

One aspect of the present invention is directed to a saw blade comprising a plurality of cutting teeth defining a cutting direction, and a repeating tooth pattern including (1) a first tooth defining a first laterally-extending upper surface having a first width W1 and a first height H1, and first side surfaces extending laterally and downwardly on opposite sides of the first upper surface relative to each other at first acute angles A1 relative to the first upper surface; (2) a second tooth located rearwardly of the first tooth with respect to the cutting direction of the saw blade, and including a second laterally-extending upper surface defining a second width W2 and a second height H2, and second side surfaces extending laterally and downwardly on opposite sides of the second upper surface relative to each other at second acute angles A2 relative to the second upper surface; and (3) a third tooth located rearwardly of the first and second teeth with respect to the cutting direction of the saw blade, and including a third laterally-extending upper surface defining a third width W3 and a third height H3, and third side surfaces extending laterally and downwardly on opposite sides of the third upper surface relative to each other at third acute angles A3 relative to the third upper surface. The first height H1 is greater than the second and third heights H2 and H3, respectively, the first width W1 is less than the second and third widths W2 and W3, respectively, and the first acute angle A1 is greater than the second and third acute angles A2 and A3, respectively.

In one embodiment of the present invention, the first height H1 is greater than the second height H2, and the second height H2 is greater than the third height H3. Also in one embodiment of the present invention, the first angle A1 is greater than the second angle A2, and the second angle A2 is greater than the third angle A3. Also in one embodiment of the present invention, the second and third widths W2 and W3, respectively, are approximately equal to each other.

Another aspect of the present invention is directed to a method for cutting a work piece, comprising the following steps:

(i) providing a saw including a plurality of cutting teeth defining a cutting direction, a feed direction, and a repeating tooth pattern including at least three teeth, wherein each tooth of the pattern defines a laterally-extending upper surface having a width and a height, and side surfaces extending laterally and downwardly on opposite sides of the upper surface relative to each other at acute angles relative to the upper surface, and within the pattern, the height of the first upper surface of a first tooth is greater than the heights of the upper surfaces of the following teeth of the pattern with respect to the cutting direction of the saw blade, the width of the first upper surface is less than the widths of the following upper surfaces, and the acute angles of the side surfaces of the first tooth are greater than the acute angles of the side surfaces of the following teeth;

(ii) substantially simultaneously moving the saw blade in the cutting direction and the feed direction in engagement with the work piece;

(iii) cutting at least one first chip from the work piece with a first cutting surface defined by the first upper surface and contiguous portions of the first side surfaces of the first tooth;

(iv) cutting at least two second chips from the work piece with two second cutting surfaces defined by portions of the side surfaces of a second tooth extending laterally outwardly relative to the first cutting surface of the first tooth;

(v) then cutting at least two third chips from the work piece with two third cutting surfaces defined by portions of the side surfaces of a third tooth extending laterally outwardly relative to the second cutting surfaces of the second tooth; and (vi) repeating steps (iii)-(v) with each recurrent pattern of teeth on the saw blade.

In one embodiment of the present invention, the work piece is a metal work piece, and the saw blade is a band saw blade. Also in one embodiment of the present invention, the method further comprises the steps of: providing an aluminum titanium nitride (AlTiN) coating on at least the cutting surfaces of the teeth; and initially running the band saw blade without any lubricant for (i) a predetermined period of time, and/or (ii) until the AlTiN coated surfaces reach a predetermined temperature, and then applying a fluid to at least the cutting surfaces of the saw blade during cutting to lubricate same.

One advantage of the currently preferred embodiments of the saw blades of the present invention is that they provide improved blade life and straightness of cut. In addition, currently preferred band saw blade embodiments of the present invention provide the ability to cut at significantly higher band speeds and/or feed rates in comparison to prior art band saw blades, and/or permit significantly improved wear and/or blade life at higher band speeds and/or feed rates in comparison to prior art band saw blades.

Other objects and advantages of the present invention will become more readily apparent in view of the following detailed description of the currently preferred embodiments and the accompanying drawings.

DETAILED DESCRIPTION OF THE CURRENTLY PREFERRED EMBODIMENTS

Figure 1:
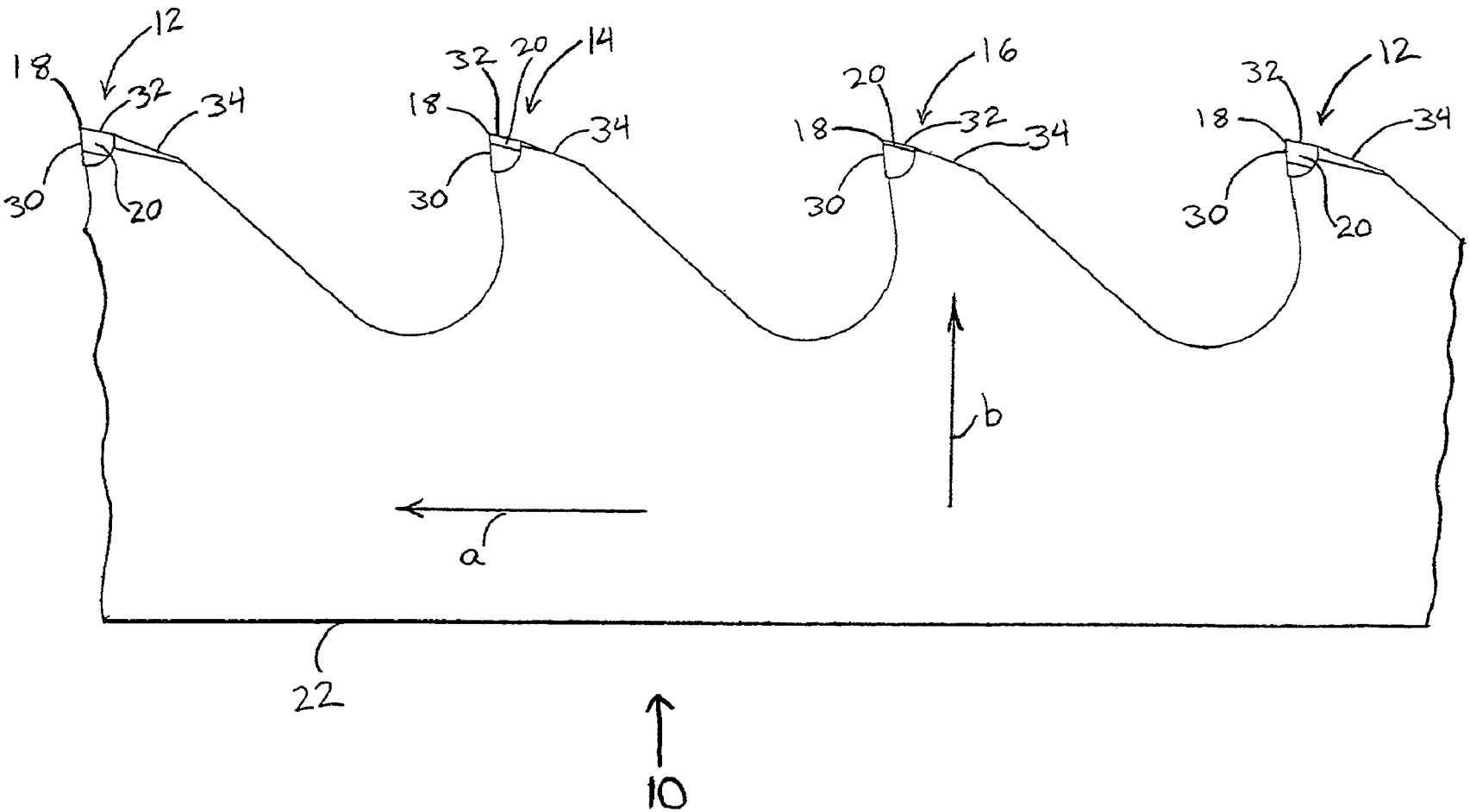
FIG. 1 is partial, a side elevational view of a band saw blade embodying the present invention.

In FIG. 1, a band saw blade embodying the present invention is indicated generally by the reference numeral 10. The band saw blade 10 defines a cutting direction indicated by the arrow "a", and a feed direction indicated by the arrow "b". The band saw blade 10 comprises a plurality of recurrent or repetitive patterns of teeth. In the illustrated embodiment, each pattern is defined by a recurrent group of three successive teeth indicated by the reference numerals 12, 14 and 16. Each tooth defines a respective pitch or tooth spacing that can be measured between the tips of adjacent teeth, or if desired, can be measured between any of numerous other corresponding points between adjacent teeth. In the currently preferred embodiments of the present invention, the repeating tooth patterns include between about 3 and about 7 teeth. However, as may be recognized by those of ordinary skill in the pertinent art based on the teachings herein, the repeating tooth patterns may include a different number of teeth depending upon the type of saw blade and/or the application of the blade. In the illustrated embodiment of the present invention, the saw blade is a metal cutting band saw blade, the teeth are carbide tipped, each tooth in the repeating tooth pattern is unset, and the first, second and third teeth of the repeating tooth pattern are successively located on the saw blade without any additional or intervening teeth therebetween. However, as may be recognized by those of ordinary skill in the pertinent art based on the teachings herein, these features are only exemplary, and may be changed as desired, or otherwise as required to meet the requirements of a particular application.

As shown typically in FIGS. 2 through 7, each tooth of the band saw blade 10 includes a tip defined by a laterally-extending upper surface 18 having a width ("W") and a height ("H"); first side surfaces 20 extending laterally and downwardly on opposite sides of the upper surface relative to each other at acute angles ("A") relative to the respective upper surface 18 (or at oblique angles relative to a central plane "CP" of a respective tooth and/or of the blade); and second side surfaces 22 extending downwardly from the outer ends of the respective first side surfaces 20. In the illustrated embodiment, the second side surfaces 22 are oriented laterally inwardly at acute angles ("B") relative to the central plane CP of the respective tooth (or at oblique angles relative to the respective upper surfaces 18).

In the currently preferred embodiments of the present invention, the first height H1 is greater than the second height H2, and the second height H2 is greater than the third height H3. Typically, the heights H are measured with respect to a back edge 22 of the band saw blade 10 (FIG. 1); however, as may be recognized by those of ordinary skill in the pertinent art based on the teachings herein, the heights H can be measured with respect to any of numerous different reference points that are currently known or used, or later become known or used for this purpose. In the illustrated embodiment, H1 is approximately 2.643 inches, H2 is approximately 2.639 inches, and H3 is approximately 2.635 inches. However, as may be recognized by those of ordinary skill in the pertinent art based on the teachings herein, these dimensions are only exemplary and can be changed as desired, or otherwise as necessary to meet the requirements of a particular application. In accordance with the currently preferred embodiments of the present invention, the difference in height H between any of the three upper surfaces 18 relative to any of the other two upper surfaces 18 (or the other upper surfaces in a repeating tooth pattern having a different number of teeth) is within the range of about 0 through about 0.045 inch. In addition, the heights H of the teeth in each repeating tooth pattern preferably progressively decrease relative to each other in a direction opposite the cutting direction "a" of the saw blade.

As shown in FIGS. 2 through 7, the first acute angle A1 is greater than the second acute angle A2, and the second acute angle A2 is greater than the third acute angle A3. In the currently preferred embodiments of the present invention, each angle is preferably within the range of about 5° through about 50°. More preferably, the first acute angle A1 is within the range of about 40° through about 50°, the second acute angle A2 is within the range of about 20° through about 30°, and the third acute angle A3 is within the range of about 5° through about 15°. In the illustrated embodiment, the first acute angle A1 is about 45°, the second acute angle A2 is about 24°, and the third acute angle A3 is about 10°. As may be recognized by those of ordinary skill in the pertinent art based on the teachings herein, these angles are only exemplary, and may be changed as desired or otherwise required by a particular application. However, regardless of the number of teeth in each repeating tooth pattern, the acute angles of the first side surfaces 20 of the teeth preferably progressively decrease relative to each other in a direction opposite the cutting direction "a" of the saw blade, or the oblique angles measured, for example, with respect to the central plane CP, preferably progressively increase relative to each other in a direction opposite the cutting direction "a" of the saw blade.

In the illustrated embodiment, each acute angle "B" of each second side surface 22 is preferably within the range of about 3° through about 10°. In the illustrated embodiment, each acute angle B is about 5°. As may be recognized by those of ordinary skill in the pertinent art based on the teachings herein, these angles are only exemplary, and may be changed as desired or otherwise required by a particular application.

Figure 3:
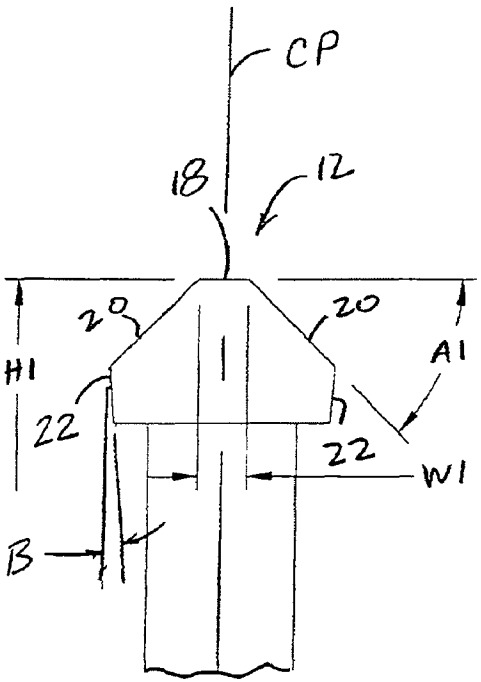
FIG. 3 is a front elevational view of the first tooth of FIG. 2.
Figure 5:
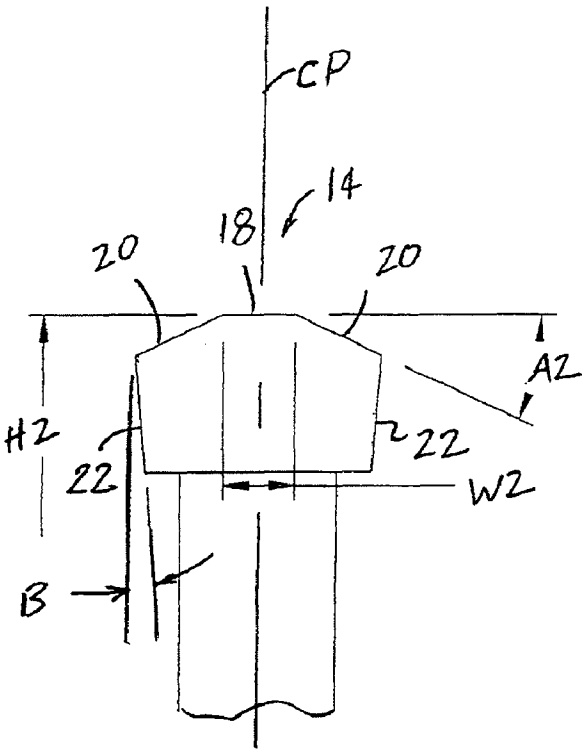
FIG. 5 is a front elevational view of the second tooth of FIG. 4.
Figure 7:
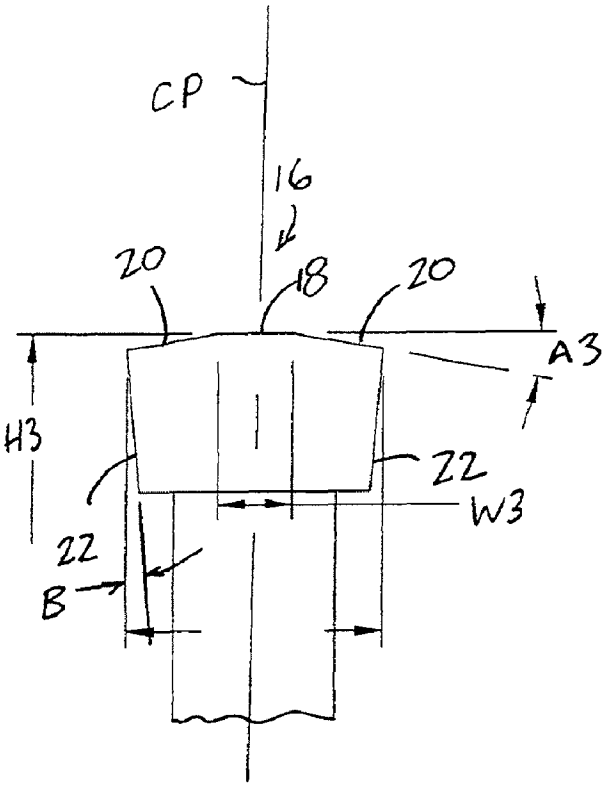
FIG. 7 is a front elevational view of the third tooth of FIG. 6.

As shown in FIGS. 3, 5 and 7, the widths "W" of the upper surfaces 18 of the teeth preferably are greater for the teeth following the first tooth 12 in the repeating tooth pattern in a direction opposite the cutting direction "a" of the saw blade. In the currently preferred embodiments of the present invention, wherein the predetermined tooth pattern is defined by (n) teeth and the saw blade defines a predetermined kerf, the first width W1 of the first upper surface 18 is less than about (1/(n+1)) of the predetermined kerf, and the widths W2–Wn of the upper surfaces 18 of the other teeth in the pattern are each substantially equal to or greater than about (1/(n+1)) of the predetermined kerf. Thus, in the illustrated embodiment wherein the repeating pattern includes three teeth, the first width W1 of the first upper surface 18 is less than about ¼ of the predetermined kerf, and the second and third widths W2 and W3 of the second and third upper surfaces 18, respectively, are each greater than about ½ of the predetermined kerf. Thus, the width W1 of the first tooth 12 is less than both the width W2 of the second tooth 14 and the width W3 of the third tooth 16. In the illustrated embodiment, the widths W2 and W3 of the second and third teeth 14 and 16, respectively, are approximately equal to each other. Also in the illustrated embodiment, the width W1 of the first tooth 12 is approximately 0.021 inch, the width W2 of the second tooth 14 is approximately 0.029 inch, and the width W3 of the third tooth 16 is approximately 0.029 inch. As may be recognized by those of ordinary skill in the pertinent art based on the teachings herein, these dimensions are only exemplary, and may be changed as desired or otherwise required by a particular application.

One advantage of the illustrated embodiments of the present invention is that the saw blades include means for creating cutting forces that are directed laterally inwardly substantially toward the central plane CP and, in turn, forming a substantially straight cut through the work piece. In the illustrated embodiment of the present invention, this means takes the form of the first, second and third side surfaces 20 being oriented at acute angles A1-A3 with respect to the first, second and third upper surfaces 18 of the teeth, respectively. This feature is significantly advantageous, particularly when cutting relatively large diameter or width work pieces, with respect to maintaining a substantially straight cut through the work pieces. In certain prior art metal cutting band saw blades, the blades may tend to wander laterally during cutting of work pieces, particularly when cutting relatively large diameter or width work pieces (for example, work pieces that are 20 inches in diameter and larger), and may, in turn, provide a cut that is less straight than otherwise desired.

Another advantage of the illustrated embodiments of the present invention is that the saw blades include means for balancing the cutting loads on the teeth in the repeating tooth pattern relative to each other. In the illustrated embodiment of the present invention, this means takes the form of the first, second and third upper surfaces 18 being located at progressively lower heights H relative to each other, and the first, second and third side surfaces 20 being oriented at progressively smaller acute angles A with respect to the respective upper surfaces 18.

Figure 8:
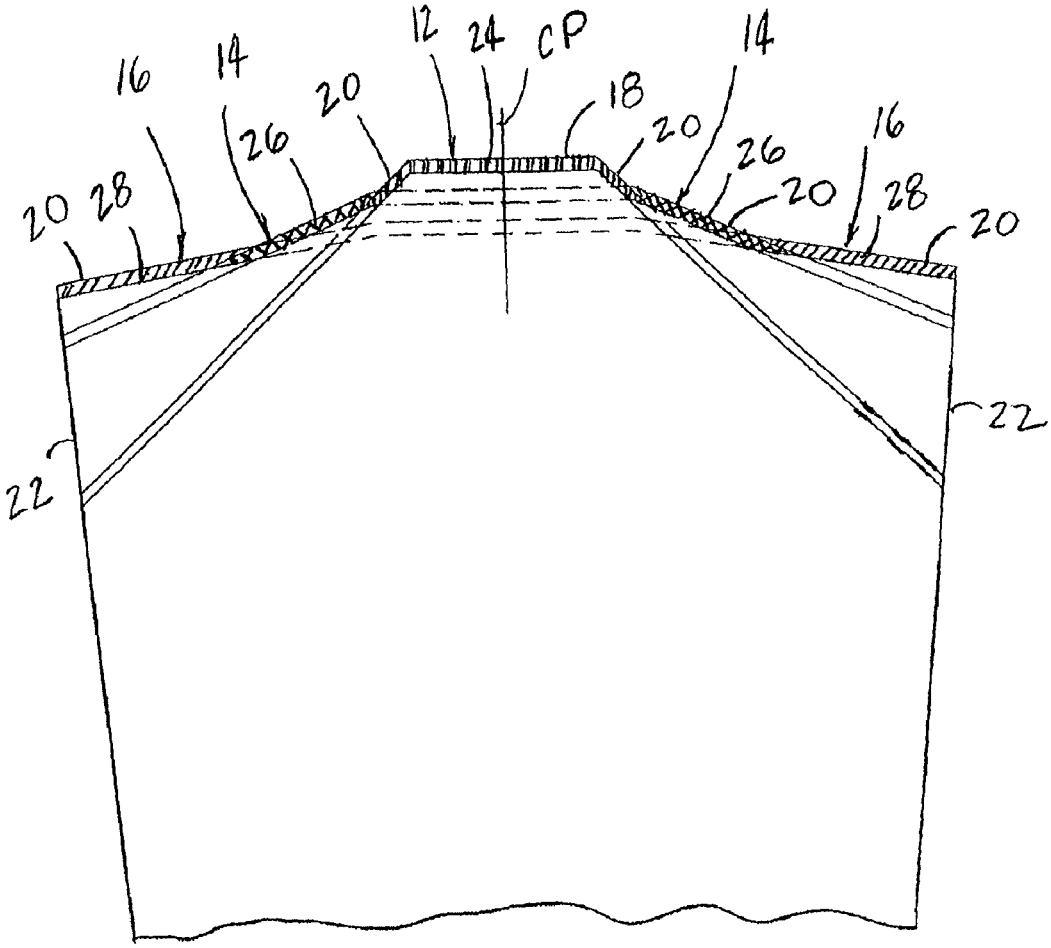
FIG. 8 is a somewhat schematic, front elevational view of the first, second and third teeth of FIGS. 1 through 7 showing the approximate cross-sectional area of material removal of each tooth and the balanced cutting loads of the teeth relative to each other.

As shown typically in FIG. 8, the first tooth 12 defines a first cross-sectional area 24 of material removed from the work piece by the respective tooth, the second tooth 14 defines second cross-sectional areas 26 of material removed from the work piece by the respective tooth, and the third tooth 16 defines third cross-sectional areas 28 of material removed from the work piece by the respective tooth. As can be seen, each tooth cuts a respective chip or chips, and thus the tooth form provides a multi-chip design. The volume of each chip is approximately equal to the respective cross-sectional area shown (24, 26 or 28) times the length of the chip in the cutting direction "a" of the saw blade. As indicated in the table below, in the illustrated embodiment, the cross-sectional area(s) of material removed by each tooth, and thus the cutting loads on the teeth in the repeating tooth pattern, are substantially balanced relative to each other.

| Tooth # | Cross-Sectional Area Of Material Removal |
|---|---|
| 12 | Cross-Sectional Area 24 = $4.5 \times 10^{-5}$ in$^2$ |
| 14 | Cross-Sectional Areas 26 = $4.6 \times 10^{-5}$ in$^2$ |
| 16 | Cross-Sectional Areas 28 = $5.8 \times 10^{-5}$ in$^2$ |

A significant advantage of this balanced tooth loading is that it provides improved wear life in comparison to prior art metal cutting band saw blades. Another advantage is that the facets or first side surfaces 20 perform a substantial portion of the cutting, particularly in connection with the second and third teeth (or other number of teeth following the first tooth in the repeating tooth pattern). As indicated above, this creates cutting forces that are directed laterally inwardly toward the central plane CP, which in turn keep the blade cutting straight to provide a relatively straight cut in comparison to prior art band saw blades.

In the illustrated embodiment of the present invention, the teeth are preferably physical vapor deposition coated with an aluminum titanium nitride (AlTiN) coating. One of the advantages of this type of coating is that it allows the band saw blade embodiments of the invention to be run faster and hotter than prior art band saw blades, thus allowing significantly faster production rates (both higher band speeds and feed rates) than otherwise achieved. With an AlTiN coating, the blade is initially run dry (i.e., without any lubricant) for a predetermined period of time to allow the blade to reach a predetermined temperature sufficient to condition the coating. In one embodiment of the present invention, the band saw blade is run dry for about 120 seconds until it reaches about 800° C. Then, the blade is lubricated in the usual manner, such as by spraying water, oil, or other lubricant and/or coolant thereon during cutting of the work piece. In other embodiments of the present invention, the run dry time is within the range of about 1 minute to about 3 minutes, and the predetermined temperature is within the range of about 750° C. through about 850° C. Also in one embodiment of the present invention, the AlTiN coated band saw blades of the invention were used to cut steel bars (type 1073 from Std. Steel) that were about 19.5 inches in diameter and defined a cross-sectional area of about 298.65 inches. The band speed was about 190 (SFM), the feed rate was about 3.35 or about 2.5 (IPM), the square inches of material cut per minute was about 33.18 square inches per minute, the time of cut was either about 6 minutes or about 8 minutes depending on the feed rate, and the total square inches of each cut was about 298.65 inches, as indicated above. The AlTiN coated band saw blades of the invention that were tested achieved on average about 36 cuts per blade, or about 10,651.85 total square inches of work piece cut per blade. Band saw blades having prior art configurations operating at the same band speeds and feed rates on the same types of work pieces achieved significantly lower wear life. For example, one prior art configuration band saw blade achieved on average about 13 cuts per blade, or about 3882.45 total square inches of material cut per blade, and another prior art configuration band saw blade achieved on average about 16 cuts per blade, or about 4778.4 total square inches of material cut per blade. Blades were considered to fail when they took too long to cut the work piece (e.g., about 20 minutes or greater), or when they failed to provide a straight cut (i.e., provided a crooked cut). Thus, the coated band saw blades of the invention provided significantly improved performance (with respect to band speed and feed rates), and significantly improved wear life in comparison to prior art band saw blades. As may be recognized by those of ordinary skill in the pertinent art based on the teachings herein, these time periods, temperatures, feed rates, and band speeds are only exemplary, and may be changed as desired or otherwise required to meet the requirements of a particular coating or application of the saw blade.

Figure 2:
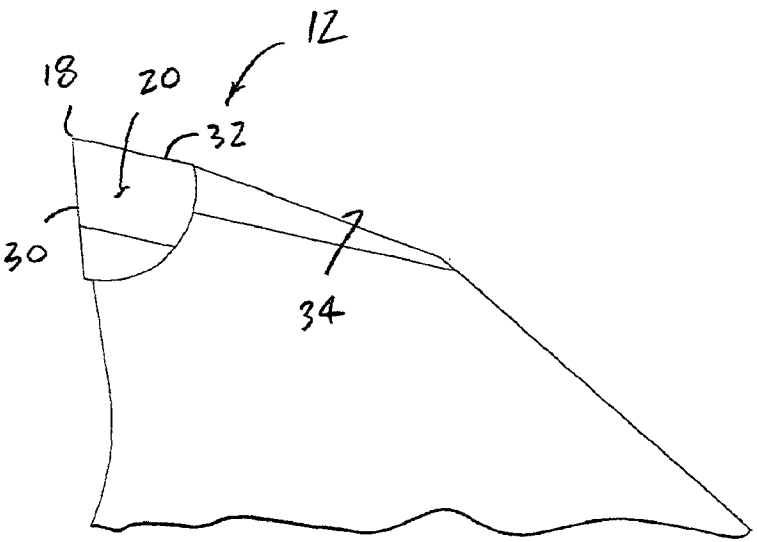
FIG. 2 is a side elevational view of a first tooth of the band saw blade of FIG. 1.
Figure 4:
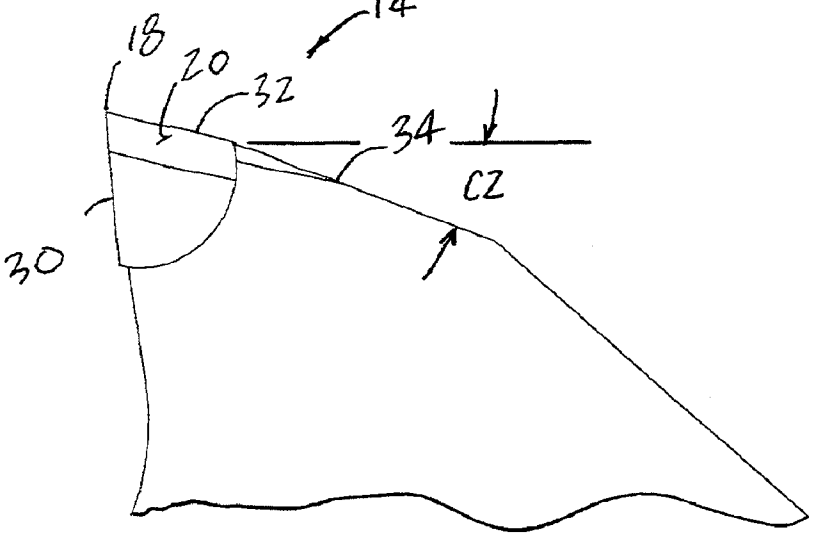
FIG. 4 is a side elevational view of a second tooth of the band saw blade of FIG. 1.
Figure 6:
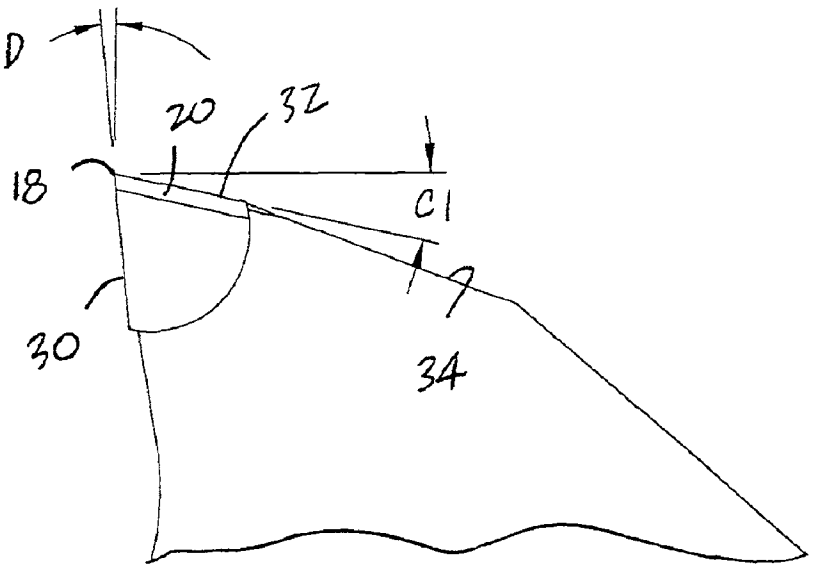
FIG. 6 is a side elevational view of a third tooth of the band saw blade of FIG. 1.

As shown in FIGS. 2, 4 and 6, each tooth further includes a rake face 30 formed on one side of the tip 18, and a primary clearance surface 32 formed on the opposite side of the tip relative to the rake face and defining a primary acute relief angle "C1" relative to the back edge 22 of the blade (FIG. 6). A secondary clearance surface 34 is formed on the opposite side of the primary clearance surface 32 relative to the tip 18, and the secondary clearance surface 34 defines a secondary acute relief angle "C2" relative to the back edge 22 of the blade that is less than the primary acute relief angle (FIG. 4). If desired, a tertiary clearance surface may be formed on the opposite side of the secondary clearance surface 34 relative to the first clearance surface 32, and may define a tertiary acute relief angle relative to the back edge 22 of the blade that is greater than each of the primary and secondary relief angles.

The primary relief angle C1 is within the range of approximately 1° through approximately 40° relative to a plane defined by the back edge 22 of the blade; and the secondary acute relief angle C2 is within the range of approximately 1° through approximately 40° relative to a plane defined by the back edge 22 of the blade. In the illustrated embodiment, the primary acute relief angle C1 is approximately 12°, and the secondary acute relief angle C2 is approximately 20°. As shown typically in FIG. 6, each rake face 30 is oriented at an acute angle "D" relative to a vertical plane (or a normal to the back edge 22 or plane extending between the tips of two unset teeth of the same height). The rake angle D is preferably within the range of about −5° through about 20°. In the illustrated embodiment, the rake angle D is about 6°. However, as may be recognized by those skilled in the pertinent art based on the teachings herein, these angles may be adjusted as desired in accordance with the requirements of a particular saw blade or application. In addition, the back edge 22 of the band saw blades of the invention may be stepped or otherwise may define irregular-shaped surface sections as taught, for example, in commonly-assigned U.S. Pat. No. 4,423,653, which is hereby expressly incorporated by reference as part of the present disclosure. In such instances, the angles defined herein with reference to the back edge may be defined with reference to the horizontal or planar portions of such modified back edges, or may be defined with reference, for example, to the plane extending between the tips of unset teeth.

In some embodiments of the present invention involving extended repeating patterns (for example, greater than about 5 teeth), the ratio of pitch to accumulated pitch for each tooth of like set direction within each pattern may increase from one tooth to the next in the direction opposite the cutting direction "a" of the saw blade to further balance the chip load over the teeth of the saw blade, in accordance with the teachings of U.S. Pat. No. 6,276,248, entitled "Band Saw Blade Having Reduced Noise And Uniform Tooth Loading Characteristics", which is assigned to the Assignee of the present invention, and is hereby expressly incorporated by reference as part of the present disclosure.

As may be recognized by those of ordinary skill in the pertinent art based on the teachings herein, any of numerous different dimensions, pitches, accumulated pitches or other dimensions may be applied depending on the particular design criteria or other desired characteristics of the saw blades within the teachings and scope of the present invention. For example, the gullet area of each tooth may be directly proportional to the accumulated pitch distance between that tooth and the next preceding tooth of like set direction, as disclosed in commonly-assigned U.S. Pat. No. 6,003,422, which is hereby expressly incorporated by reference as part of the present disclosure. Similarly, any of numerous different tooth forms may be employed, including one or more of the tooth forms or other geometries disclosed in U.S. Pat. No. 6,167,792, which is assigned to the Assignee of the present invention, and is hereby expressly incorporated by reference as part of the present disclosure.

In addition, if desired, each tooth may define a different pitch than a plurality of other teeth within the respective repeating pattern. One of the advantages of this feature is that during cutting operations, each tooth entering or exiting the workpiece generates a different forcing frequency than every other tooth simultaneously entering or exiting the workpiece, or the other teeth successively entering or exiting the workpiece, thus reducing noise and vibration during cutting operations, and facilitating blade operation. The forcing frequency ("f") of each tooth may be determined based on the band speed ("BS") and the pitch ("P") in accordance with the following equation: f=BS/5P, wherein f is in cycles/second, BS is in feet/minute, and P is in inches. Thus, by providing each tooth with a different pitch than a plurality of other teeth within the pitch pattern, each tooth will generate a different forcing frequency upon cutting a workpiece. Accordingly, each tooth entering or exiting the workpiece during cutting operations typically will generate a different forcing frequency than every other tooth simultaneously entering or exiting the workpiece, and/or successively entering or exiting the workpiece.

As may be recognized by those of ordinary skill in the pertinent art based on the teachings herein, numerous changes and modifications can be made to the above-described and other embodiments of the present invention without departing from the scope of the invention as defined in the appended claims. For example, although the teeth are carbide tipped, the teeth may define any of numerous different constructions that are currently known, or later become known, including a bi-metal or other constructions. Similarly, although the teeth in each repeating pattern are unset, one or more of the teeth may be set. In addition, the repeating pattern may include any number of teeth desired (for example, at least two teeth and any practicable number of teeth greater than two teeth), the saw blade may include more than one repeating pattern, or additional teeth may be located between or among the teeth of the repeating pattern. In addition, although the saw blades illustrated above define progressively lower tooth heights in a direction opposite the cutting direction of the saw blade, the tooth heights could be arranged into a non-progressive pattern. Further, the saw blades of the present invention may be coated with any of numerous different coatings that are currently or later become known, such as a titanium nitride coating (TiN), or the saw blades may not include any coating at all. Accordingly, this detailed description of the currently preferred embodiments is to be taken in an illustrative, as opposed to a limiting sense.

What is claimed is:

[1. A saw blade comprising:

a plurality of cutting teeth defining a cutting direction, and a repeating pattern of non-overlapping groups of successive teeth, each group including (1) a first tooth defining a first laterally-extending upper surface having a first width and a first height, and first side surfaces extending laterally and downwardly on opposite sides of the first upper surface relative to each other at first acute angles relative to the first upper surface; (2) a second tooth located rearwardly of the first tooth with respect to the cutting direction of the saw blade, and including a second laterally-extending upper surface defining a second width and a second height, and second side surfaces extending laterally and downwardly on opposite sides of the second upper surface relative to each other at second acute angles relative to the second upper surface; and (3) a third tooth located rearwardly of the first and second teeth with respect to the cutting direction of the saw blade, and including a third laterally-extending upper surface defining a third width and a third height, and third side surfaces extending laterally and downwardly on opposite sides of the third upper surface relative to each other at third acute angles relative to the third upper surface; and wherein the first height is greater than the second and third heights, the first width is less than the second and third widths, and the first acute angle is greater than the second and third acute angles.]

[2. A saw blade as defined in claim 1, wherein the first height is greater than the second height, and the second height is greater than the third height.]

[3. A saw blade as defined in claim 2, wherein the first angle is greater than the second angle, and the second angle is greater than the third angle.]

[4. A saw blade as defined in claim 3, wherein the second and third widths are approximately equal to each other.]

[5. A saw blade as defined in claim 1, wherein the saw blade is a band saw blade.]

[6. A saw blade as defined in claim 5, wherein the saw blade is a metal cutting band saw blade.]

[7. A saw blade as defined in claim 1, wherein the teeth are carbide tipped.]

[8. A saw blade as defined in claim 1, wherein each group in the repeating tooth pattern includes from about 3 teeth through about 7 teeth.]

[9. A saw blade as defined in claim 1, wherein each tooth includes an aluminum titanium nitride coating on at least the respective upper and side surfaces thereof.]

[10. A saw blade as defined in claim 9, wherein the aluminum titanium nitride coating is a physical vapor deposition coating.]

[11. A saw blade as defined in claim 1, wherein the first, second and third teeth are located on the saw blade without any additional teeth therebetween.]

[12. A saw blade as defined in claim 1, wherein the first, second and third acute angles are each with the range of about 5° through about 50°.]

[13. A saw blade as defined in claim 12, wherein the first angle is about 45°.]

[14. A saw blade as defined in claim 12, wherein the second angle is within the range of about 20° through about 30°.]

[15. A saw blade as defined in claim 12, wherein the third angle is within the range of about 5° through about 15°.]

[16. A saw blade as defined in claim 1, wherein each of the first, second and third teeth is unset.]

[17. A saw blade as defined in claim 16, wherein each tooth in the repeating tooth pattern is unset.]

[18. A saw blade as defined in claim 1, wherein the difference in height between any of the three upper surfaces relative to any of the other two upper surfaces is within the range of about 0 and about 0.045 inch.]

[19. A saw blade as defined in claim 18, wherein the height of each upper surface is measured with respect to a back edge of the saw blade.]

[20. A saw blade as defined in claim 1, wherein the heights of the teeth in the repeating tooth pattern are progressively lower in a direction opposite the cutting direction of the saw blade.]

[21. A saw blade as defined in claim 1, wherein the repeating tooth pattern is defined by three teeth, the saw blade defines a predetermined kerf the first width of the first upper surface is less than about ¼ of the predetermined kerf, and the second and third widths of the second and third upper surfaces, respectively, are each greater than about ¼ of the predetermined kerf.]

[22. A saw blade as defined in claim 1, wherein the predetermined tooth pattern is defined by (n) teeth, the saw blade defines a predetermined kerf, the first width of the first upper surface is less than about (1/(n+1)) of the predetermined kerf and the widths of the upper surfaces of the other teeth in the pattern are each substantially equal to or greater than about (1(n+1)) of the predetermined kerf.]

[23. A saw blade comprising:

a plurality of cutting teeth defining a substantially central plane, a cutting direction, and a repeating pattern of non-overlapping groups of successive teeth, each group including (1) a first tooth defining a first laterally-extending upper surface having a first width and a first height, and first side surfaces extending laterally and downwardly on opposite sides of the first upper surface relative to each other; (2) a second tooth located rearwardly of the first tooth with respect to the cutting direction of the saw blade, and including a second laterally-extending upper surface defining a second width and a second height, and second side surfaces extending laterally and downwardly on opposite sides of the second upper surface relative to each other; and (3) a third tooth located rearwardly of the first and second teeth with respect to the cutting direction of the saw blade, and including a third laterally-extending upper surface defining a third width and a third height, and third side surfaces extending laterally and downwardly on opposite sides of the third upper surface relative to each other, wherein the first height is greater than the second and third heights; and first means for creating cutting forces that are directed laterally inwardly substantially toward the central plane and, in turn, forming a substantially straight cut through a workpiece.]

[24. A saw blade as defined in claim 23, wherein the first means is defined by the first, second and third side surfaces being oriented at acute angles with respect to the first, second and third upper surfaces, respectively.]

[25. A saw blade as defined in claim 24, wherein the first side surfaces are each located at a first acute angle with respect to the first upper surface, the second side surfaces are each located at a second acute angle with respect to the second upper surface, and the third side surfaces are each located at a third acute angle with respect to the third upper surface.]

[26. A saw blade as defined in claim 25, wherein the first angle is greater than the second angle, and the second angle is greater than the third angle.]

[27. A saw blade as defined in claim 23, wherein the first height is greater than the second height, and the second height is greater than the third height.]

[28. A saw blade as defined in claim 23, wherein the second and third widths are approximately equal to each other.]

[29. A saw blade as defined in claim 23, wherein the first, second and third teeth are located on the saw blade without any additional teeth therebetween.]

[30. A saw blade comprising:

a plurality of cutting teeth defining a substantially central plane, a cutting direction, and a repeating pattern of non-overlapping groups of successive teeth, each group including (1) a first tooth defining a first laterally-extending upper surface having a first width and a first height, and first side surfaces extending laterally and downwardly on opposite sides of the first upper surface relative to each other; (2) a second tooth located rearwardly of the first tooth with respect to the cutting direction of the saw blade, and including a second laterally-extending upper surface defining a second width and a second height, and second side surfaces extending laterally and downwardly on opposite sides of the second upper surface relative to each other; and (3) a third tooth located rearwardly of the first and second teeth with respect to the cutting direction of the saw blade, and including a third laterally-extending upper surface defining a third width and a third height, and third side surfaces extending laterally and downwardly on opposite sides of the third upper surface relative to each other, wherein the first height is greater than the second and third heights;

first means for creating cutting forces that are directed laterally inwardly substantially toward the central plane and, in turn, forming a substantially straight cut through a workpiece; and second means for balancing the cutting loads on the teeth in the repeating tooth pattern relative to each other.]

[31. A saw blade as defined in claim 30, wherein the first means is defined by the first, second and third side surfaces being oriented at acute angles with respect to the first, second and third upper surfaces, respectively.]

[32. A saw blade as defined in claim 30, wherein the second means is defined by the first, second and third upper surfaces being located at progressively lower heights relative to each other, and the first, second and third side surfaces being oriented at progressively smaller acute angles with respect to the respective upper surfaces.]

[33. A saw blade for cutting a work piece, comprising:

a plurality of cutting teeth defining a cutting direction, and a repeating pattern of non-overlapping groups of successive teeth, each group including (1) a first tooth defining a first laterally-extending upper surface having a first width and a first height, and first side surfaces extending laterally and downwardly on opposite sides of the first upper surface relative to each other at first acute angles relative to the first upper surface, wherein the first upper surface, and positions of the first side surfaces contiguous to the first upper surface define a first cutting surface fin cutting first chips from the work piece; (2) a second tooth located rearwardly of the first tooth with respect to the cutting direction of the saw blade, and including a second laterally-extending upper surface defining a second width and a second height less than the first height, and second side surfaces extending laterally and downwardly on opposite sides of the second upper surface relative to each other at second acute angles relative to the second upper surface that are less than the first acute angle, and wherein portions of the second side surfaces extending laterally outwardly relative to the first cutting surface define second cutting surfaces for cutting second chips from the work piece; and (3) a third tooth located rearwardly of the first and second teeth with respect to the cutting direction of the saw blade, and including a third laterally-extending upper surface defining a third width and a third height that is less than the first height, and third side surfaces extending laterally and downwardly on opposite sides of the third upper surface relative to each other at third acute angles relative to the third upper surface that are less than the first acute angle, and wherein portions of the third side surfaces extending laterally outwardly relative to the second cutting surfaces define third cutting surfaces for cutting third chips from the work piece.]

[34. A saw blade as defined in claim 33, wherein the first width is less than the second and third widths.]

[35. A saw blade as defined in claim 34, wherein the second and third widths are approximately equal to each other.]

[36. A saw blade as defined in claim 33, wherein the first height is greater than the second height, and the second height is greater than the third height.]

[37. A saw blade as defined in claim 33, wherein the first angle is greater than the second angle, and the second angle is greater than the third angle.]

[38. A saw blade as defined in claim 33, wherein the first, second and third teeth are located on the saw blade without any additional teeth therebetween.]

[39. A saw blade comprising:

a plurality of cutting teeth defining a substantially central plane, a cutting direction, and a repeating pattern of groups of successive teeth, each group including (1) a first tooth defining a first laterally-extending upper surface having a first width and a first height, and first side surfaces extending laterally and downwardly on opposite sides of the first upper surface relative to each other (2) a second tooth located rearwardly of the first tooth with respect to the cutting direction of the saw blade, and including a second laterally-extending upper surface defining a second width and a second height, and second side surfaces extending laterally and downwardly on opposite sides of the second upper surface relative to each other; and (3) a third tooth located rearwardly of the first and second teeth with respect to the cutting direction of the saw blade, and including a third laterally-extending upper surface defining a third width and a third height, and third side surfaces extending laterally and downwardly on opposite sides of the third upper surface relative to each other, wherein the first height is greater than the second and third heights, and the first, second and third teeth are located on the saw blade without any additional teeth therebetween;

first means for creating cutting forces that are directed laterally inwardly substantially toward the central plane and, in turn, forming a substantially straight cut through a workpiece; and second means for balancing the cutting loads on the teeth in the repeating tooth pattern relative to each other.]

*40. A multi-chip, aluminum titanium nitride coated, metal cutting band saw blade for cutting a metal work piece, comprising:*

*a plurality of cutting teeth defining a cutting direction of the band saw blade, a feed direction of the band saw blade that is transverse to the cutting direction of the band saw blade, and a repeating pattern of groups of successive teeth, wherein each group of successive teeth includes:*

*a lead tooth defining a first laterally-extending cutting surface facing the cutting direction of the band saw blade for cutting at least one first chip from the metal work piece, wherein the first laterally-extending cutting surface is oriented substantially normal to a central plane of the band saw blade and defines a first height, and the lead tooth defines a primary clearance surface defining an acute primary clearance angle, and a secondary clearance surface defining an acute secondary clearance angle greater than the primary clearance angle; and*

*a plurality of trailing teeth following the lead tooth, wherein each trailing tooth defines a primary clearance surface defining an acute primary clearance angle, and a secondary clearance surface defining a secondary clearance angle greater than the primary clearance angle, and the plurality of trailing teeth define:*

*a second laterally-extending cutting surface facing the cutting direction of the band saw blade, located to one side of the first laterally-extending cutting surface, oriented at a second acute angle relative to the first laterally-extending cutting surface, and defining a second height different than the first height, for cutting at least one second chip from the metal cutting work piece; and*

*a third laterally-extending cutting surface facing the cutting direction of the band saw blade, located to one side of the first laterally-extending cutting surface and on an opposite side of the first laterally-extending cutting surface relative to the second laterally-extending cutting surface, oriented at a third acute angle relative to the first laterally-extending cutting surface, and defining a third height different than the first height, for cutting at least one third chip from the metal cutting work piece; and*

*an aluminum titanium nitride coating overlying each of the first, second and third cutting surfaces.*

*41. A multi-chip, aluminum titanium nitride coated, metal cutting band saw blade for cutting a metal work piece as defined in claim 40, wherein the plurality of trailing teeth further define:*

*a fourth laterally-extending cutting surface facing the cutting direction of the band saw blade, located to one side of the second laterally-extending cutting surface and on an opposite side of the second laterally-extending cutting surface relative to the first laterally-extending cutting surface, oriented at a fourth acute angle relative to the first laterally-extending cutting surface, and defining a fourth height different than the first height, for cutting at least one fourth chip from the metal cutting work piece; and*

*a fifth laterally-extending cutting surface facing the cutting direction of the band saw blade, located to one side of the third trailing laterally-extending cutting surface and on an opposite side of the third laterally-extending cutting surface relative to the first laterally-extending cutting surface, oriented at a fifth acute angle relative to the first laterally-extending cutting surface, and defining a fifth height different than the first height, for cutting at least one fifth chip from the metal cutting work piece; and*

*wherein the aluminum titanium nitride coating overlies each of the first, second, third, fourth and fifth cutting surfaces.*

*42. A multi-chip, aluminum titanium nitride coated, metal cutting band saw blade for cutting a metal work piece as defined in claim 41, wherein the first height is greater than each of the second, third, fourth and fifth heights.*

*43. A multi-chip, aluminum titanium nitride coated, metal cutting band saw blade for cutting a metal work piece as defined in claim 41, wherein the second and third heights are approximately equal, and the fourth and fifth heights are approximately equal.*

*44. A multi-chip, aluminum titanium nitride coated, metal cutting band saw blade for cutting a metal work piece as defined in claim 43, wherein the second and third heights are lower than the first height, and the fourth and fifth heights are lower than the second and third heights.*

*45. A multi-chip, aluminum titanium nitride coated, metal cutting band saw blade for cutting a metal work piece as defined in claim 41, wherein the second and third acute angles are approximately equal, and the fourth and fifth acute angles are approximately equal.*

*46. A multi-chip, aluminum titanium nitride coated, metal cutting band saw blade for cutting a metal work piece as defined in claim 45, wherein the second and third acute angles are greater than the fourth and fifth acute angles.*

*47. A multi-chip, aluminum titanium nitride coated, metal cutting band saw blade for cutting a metal work piece as defined in claim 45, wherein the second and third acute*

*angles are within the range of about 5° through about 50°, and the fourth and fifth acute angles are within the range of about 5° through about 15°.*

*48. A multi-chip, aluminum titanium nitride coated, metal cutting band saw blade for cutting a metal work piece as defined in claim 40, wherein the teeth are one of carbide tipped and bi-metal.*

*49. A multi-chip, aluminum titanium nitride coated, metal cutting band saw blade for cutting a metal work piece as defined in claim 40, wherein the second and third laterally-extending cutting surfaces are defined by a first trailing tooth, and the fourth and fifth laterally-extending cutting surfaces are defined by a second trailing tooth following the first trailing tooth.*

*50. A multi-chip, aluminum titanium nitride coated, metal cutting band saw blade for cutting a metal work piece as defined in claim 40, wherein the lead tooth and a first and second of the plurality of trailing teeth are located on the band saw blade without any additional teeth therebetween.*

*51. A multi-chip, aluminum titanium nitride coated, metal cutting band saw blade for cutting a metal work piece as defined in claim 40, wherein the height of each cutting surface is measured with respect to a back edge of the band saw blade.*

*52. A multi-chip, aluminum titanium nitride coated, metal cutting band saw blade for cutting a metal work piece as defined in claim 40, wherein the aluminum titanium nitride coating is a physical vapor deposition coating.*

*53. A multi-chip, aluminum titanium nitride coated, metal cutting band saw blade for cutting a metal work piece as defined in claim 40, wherein the groups of successive teeth are non-overlapping.*

*54. A multi-chip, aluminum titanium nitride coated, metal cutting band saw blade for cutting a metal work piece as defined in claim 40, wherein the primary and secondary clearance angles each are within the range of about 1° through about 40°.*

*55. A multi-chip, aluminum titanium nitride coated, metal cutting band saw blade for cutting a metal work piece as defined in claim 54, wherein each tooth further includes a tertiary clearance surface defining an acute tertiary clearance angle that is greater than the respective acute secondary clearance angle.*

*56. A multi-chip, aluminum titanium nitride coated, metal cutting band saw blade for cutting a metal work piece, comprising:*

*a plurality of cutting teeth defining a cutting direction of the band saw blade, a feed direction of the band saw blade that is transverse to the cutting direction of the band saw blade, and a repeating pattern of groups of successive teeth, wherein each group of successive teeth includes:*

*a lead tooth including first means extending laterally on the lead tooth and facing the cutting direction of the band saw blade for cutting at least one first chip from the metal work piece, wherein the first means is oriented substantially normal to a central plane of the band saw blade and defines a first height, and the lead tooth defines a primary clearance surface defining an acute primary clearance angle, and a secondary clearance surface defining an acute secondary clearance angle greater than the primary clearance angle; and*

*a plurality of trailing teeth following the lead tooth, wherein each trailing tooth defines a primary clearance surface defining an acute primary clearance angle, and a secondary clearance surface defining an acute secondary clearance angle greater than the primary clearance angle, and the plurality of trailing teeth define:*

*second means for cutting at least one second chip from the metal cutting work piece, wherein the second means is located to a first side of the first means, is oriented at a second acute angle relative to the first means, and defines a second height different than the first height; and*

*third means for cutting at least one third chip from the metal cutting work piece, wherein the third means faces the cutting direction of the band saw blade, is located to a second side of the first means that is opposite the first side, is oriented at a third acute angle relative to the first means, and defines a third height different than the first height; and*

*an aluminum titanium nitride coating physical vapor deposition coated over each of the first, second and third means.*

*57. A multi-chip, aluminum titanium nitride coated, metal cutting band saw blade for cutting a metal work piece as defined in claim 56, wherein the plurality of trailing teeth further define:*

*fourth means for cutting at least one fourth chip from the metal cutting work piece, wherein the fourth means faces the cutting direction of the band saw blade, is located to one side of the second means on an opposite side of the second means relative to the first means, is oriented at a fourth acute angle relative to the first means, and defines a fourth height different than the first height; and*

*fifth means for cutting at least one fifth chip from the metal cutting work piece, wherein the fifth means faces the cutting direction of the band saw blade, is located to one side of the third means and is on an opposite side of the third means relative to the first means, is oriented at a fifth acute angle relative to the first means, and defines a fifth height different than the first height; and*

*wherein the aluminum titanium nitride coating is physical vapor deposition coated over each of the first, second, third, fourth and fifth means.*

*58. A multi-chip, aluminum titanium nitride coated, metal cutting band saw blade for cutting a metal work piece as defined in claim 57, wherein the first means is a first laterally-extending cutting surface, the second means is a second laterally-extending cutting surface, the third means is a third laterally-extending cutting surface, the fourth means is a fourth laterally-extending cutting surface, and the fifth means is a fifth laterally-extending cutting surface.*

*59. A multi-chip, aluminum titanium nitride coated, metal cutting band saw blade for cutting a metal work piece as defined in claim 56, further comprising means for creating cutting forces that are directed laterally inwardly substantially toward the central plane and, in turn, forming a substantially straight cut through the work piece.*

*60. A multi-chip, aluminum titanium nitride coated, metal cutting band saw blade for cutting a metal work piece as defined in claim 56, further comprising means for balancing the cutting loads on the teeth in the repeating tooth pattern relative to each other.*

* * * * *